July 1, 1941.  T. E. TORKELSON  2,247,895
PERFORATING MACHINE
Original Filed Nov. 11, 1937  13 Sheets-Sheet 6

FIG. 2.

NEW ACCOUNT CARD

FIG. 3.

FIRST BALANCE CARD

FIG. 4.

CARD PUNCHED IN COLUMN "60" TO SELECT 10th PRINTING LINE

FIG. 5.

CARD PUNCHED IN COLUMN "60" TO SELECT 11th PRINTING LINE

INVENTOR
Torkel E. Torkelson
BY
ATTORNEYS

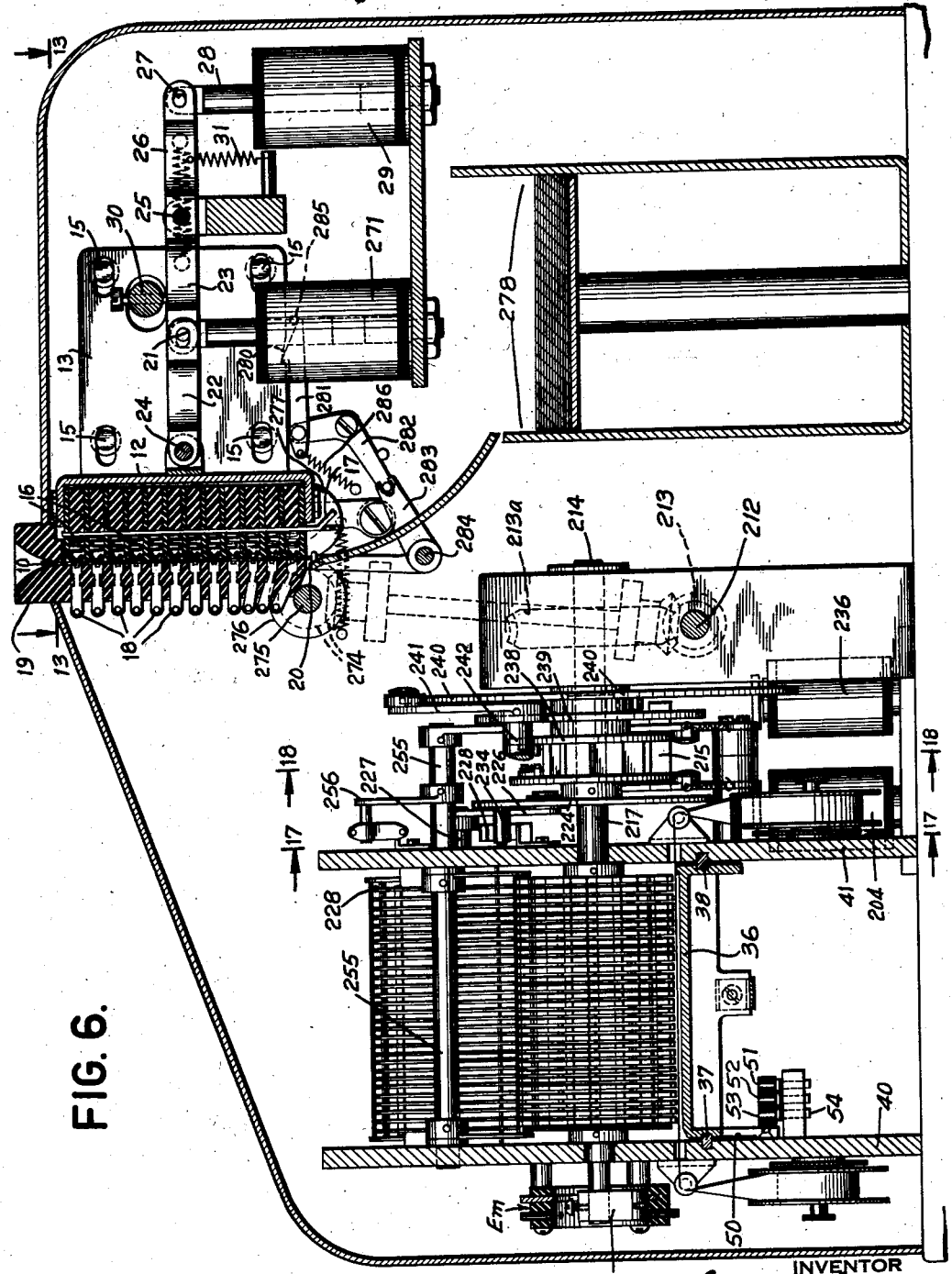

July 1, 1941.   T. E. TORKELSON   2,247,895
PERFORATING MACHINE
Original Filed Nov. 11, 1937   13 Sheets-Sheet 8

INVENTOR
Torkel E. Torkelson
BY
ATTORNEYS

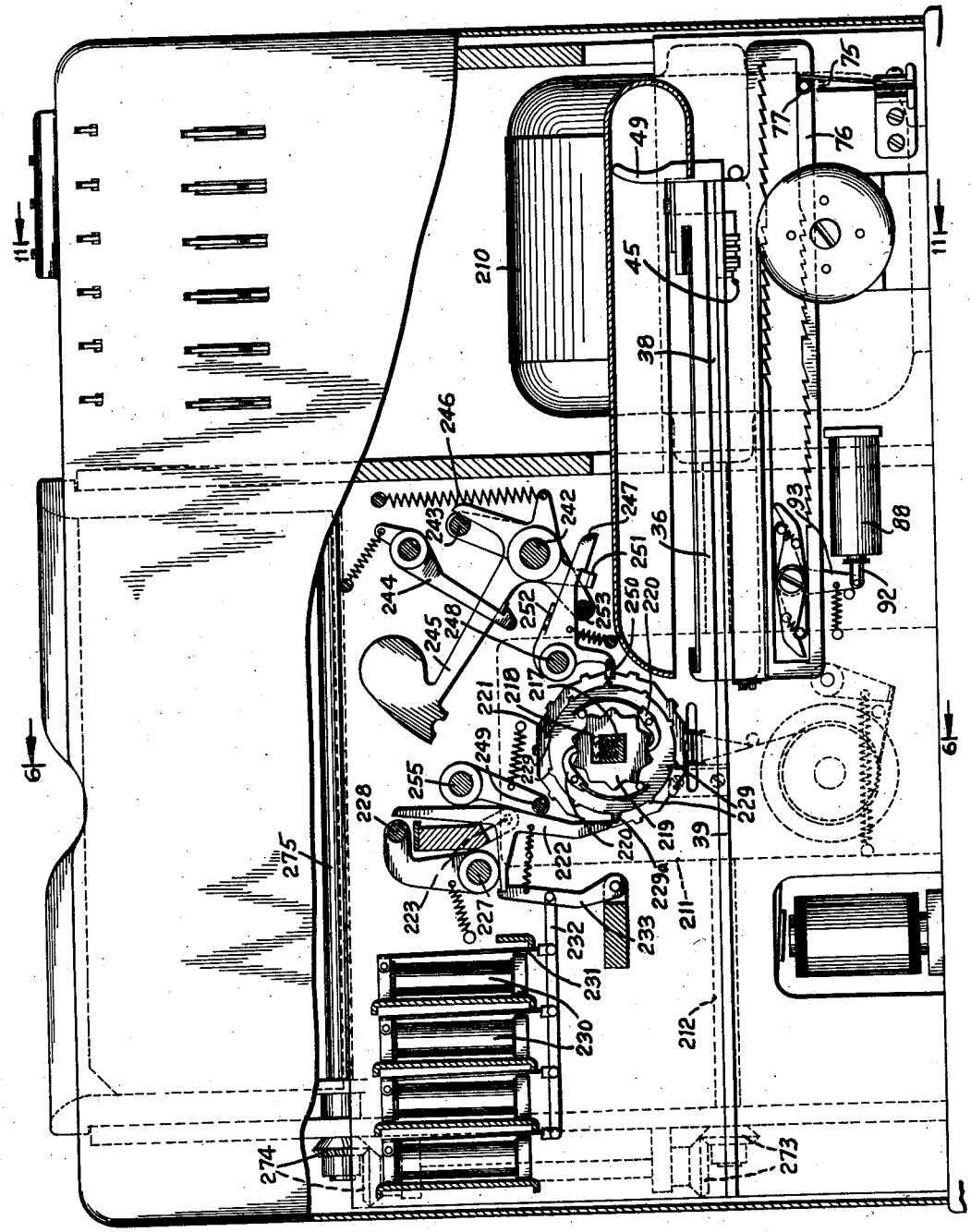

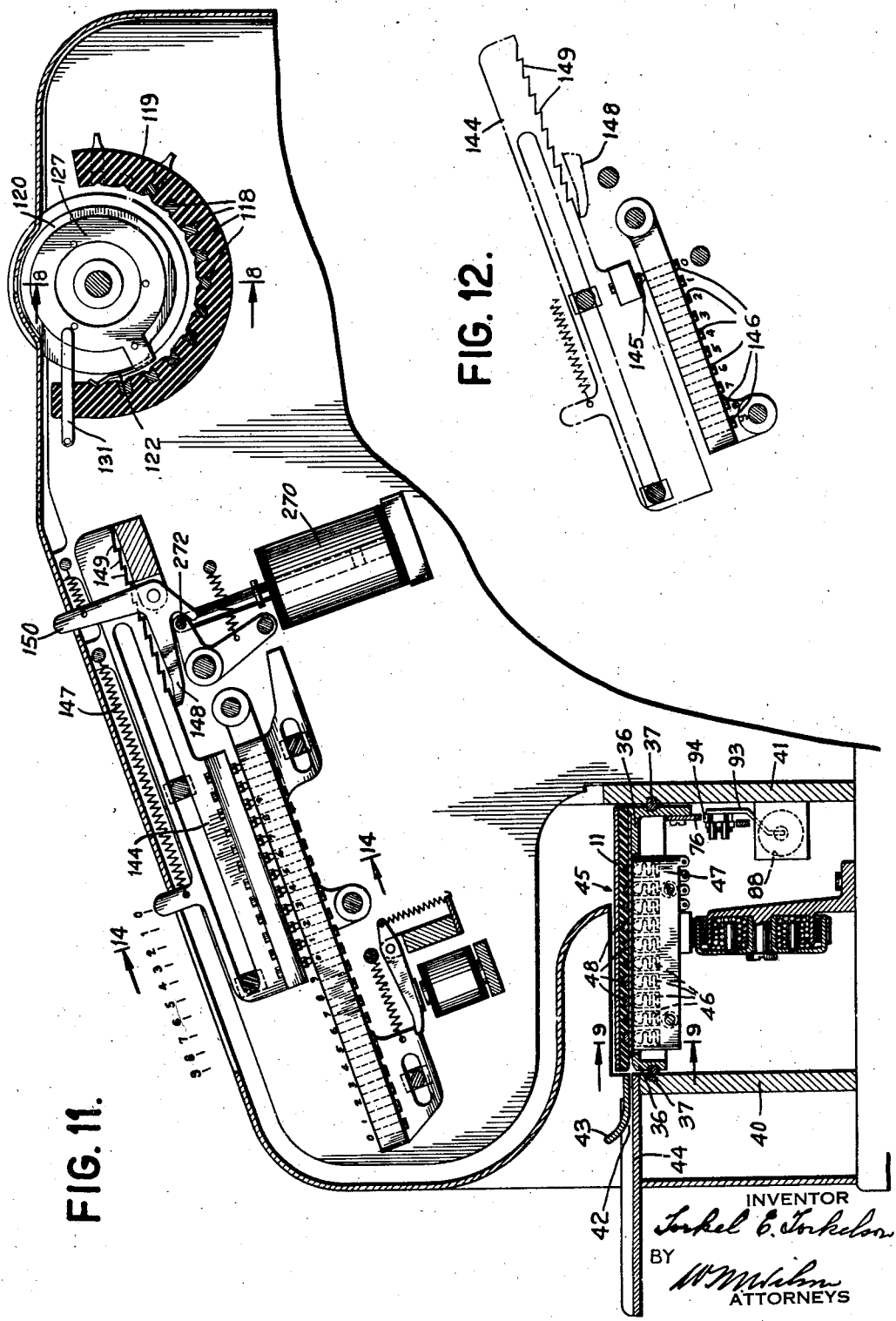

July 1, 1941.  T. E. TORKELSON  2,247,895
PERFORATING MACHINE
Original Filed Nov. 11, 1937  13 Sheets-Sheet 11

July 1, 1941.    T. E. TORKELSON    2,247,895
PERFORATING MACHINE
Original Filed Nov. 11, 1937    13 Sheets-Sheet 12

INVENTOR
Torkel E. Torkelson
BY
ATTORNEYS

July 1, 1941.   T. E. TORKELSON   2,247,895
PERFORATING MACHINE
Original Filed Nov. 11, 1937   13 Sheets-Sheet 13

INVENTOR
Torkel E. Torkelson
BY
ATTORNEYS

Patented July 1, 1941

2,247,895

UNITED STATES PATENT OFFICE 2,247,895

PERFORATING MACHINE

Torkel E. Torkelson, Baldwin, N. Y., assignor to International Business Machines Corporation, New York, N. Y., a corporation of New York Original application November 11, 1937, Serial No. 173,975. Divided and this application February 15, 1939, Serial No. 256,527

10 Claims. (Cl. 164—115)

This application is a divisional application of the parent application Serial No. 173,975, filed November 11, 1937, and is restricted to certain features of the invention disclosed in the parent application directed to improvements in card perforating machines.

This invention relates to a card controlled tabulating machine and particularly to improvements which adapt the machine for handling banking transactions and especially for automatic accounting of transactions involved in a savings account.

The main object of the invention disclosed herein is to devise a machine which permits the use of tabulating cards for representing the successive transactions and which represent primarily the amount of the transactions and each new balance which is computed from the tabulating card representing the previous balance and the withdrawal or deposit amount entered in the machine. Such tabulating cards may be utilized to control a tabulating machine of a well known form so that a detailed statement of the transactions may be provided.

A still further object of the invention is to provide means to punch each successive transaction card to represent other data such as the account number, the name and address of the person carrying the account, the date of each transaction, pass-book printing line selecting data, the type of transaction and other data, the purpose of which will be understood as the operation of the machine is set forth.

One of the objects of the present invention is to devise an improved means for comparing the account number data on the transaction card with the account number data on the pass-book so that the latter will receive only the transaction entries pertaining to that pass-book and the successive transaction card will be punched to represent the same account number, the deposit or withdrawal amount, pass-book line selecting data, the type of transaction and other data pertaining to the new transaction.

A still further object of the invention is to automatically duplicate on the next transaction card the data on the previous transaction card, such as the account number data, the name and address data, etc.

As previously intimated, each new transaction card is perforated in a single column so that this perforation may control the next differential displacement of the pass-book carriage. A further object of the invention consists in the provision of means for interpreting this data and to control means to cause the punching machine to punch the next transaction card with line selection data so that the next line on the pass-book will be selected for printing operations.

Another object of the invention is the provision of means for setting up the dates and which data is printed on the pass-book and perforated on the tabulating cards.

A still further object of the invention is to provide a manually settable means for setting up the amount of the withdrawal or deposit and which means electrically controls the selection of the punch magnets of the punching machine so that this data is represented by perforations made in the transaction card.

A still further object consists in the design of means which represents a simplification of means previously devised to secure certain of the results attained herein, being particularly concerned with the account number comparing means, the means under control of the comparing means to determine whether the punching mechanism will operate at all to duplicate certain data, and the provision of means whereby a well known form of punching machine may be utilized in connection with the improved machine with very little modification so as to provide the perforation of a successive transaction card with a designation for selecting the next line of the related pass-book.

Other objects of the invention will be pointed out in the following description and claims and illustrated in the accompanying drawings which disclose, by way of example, the principle of the invention, and the best mode which has been contemplated of applying that principle.

In said drawings:

Figs. 1a-1e when placed in a horizontal arrangement in the order 1a, 1b, 1c, 1d, 1e disclose an electrical wiring diagram for the machine.

Figs. 2, 3, 4 and 5 disclose examples of tabulating cards used in connection with the banking system herein described, and their significance is identified by lettering at the left side of each card and the data interpreted by legends on the bottom of the columns.

Fig. 6 is a sectional view taken on line 6—6 of Fig. 10.

Fig. 10 is an end view of the machine disclosed herein, the cabinet cover being broken away to show certain parts enclosed thereby.

Fig. 11 is a sectional view taken on the line 11—11 of Fig. 10 and discloses the deposit or withdrawal amount setting slides.

Fig. 12 is a detail view showing a certain portion of the contact making mechanism associated with one of the amount setting slides.

As previously explained, the improved machine is adapted to be utilized for accounting of deposits and withdrawals made in a bank. In order to better understand the operation of the machine, its operation will be given in an orderly manner commencing with the preparation of a balance card and pass-book for an initial account and then for subsequent deposits and withdrawals which make up the subsequent transactions at the bank in which the account is placed.

Figure 2 is a showing of a tabulating card of a well known form and is of the type shown in the patent to C. D. Lake, No. 1,772,492, dated August 12, 1930. The tabulating card contains perforations in vertical columns which are adapted to represent digital values and also alphabetical characters for alphabet data. Each tabulating card, representing an initial transaction for a new account as card 10 in Fig. 2 or for a subsequent transaction as by card 101 in Fig. 3, is divided into fields which in succession from left to right represent the account number, the name of the depositor, the address thereof and the date. The remaining card fields include a single column in which is located one or more perforations to select the line for which recording is effected on the pass-book. The next card field is perforated to represent the old balance and which in the initial deposit is perforated to represent zero. The next card field comprises a single column designating the type of transaction, namely, a withdrawal or deposit. One of the two card fields at the extreme right are allocated for the designation of the amount of the transaction whether it is a withdrawal or deposit and the other for the amount of the new balance.

The blank card which is to indicate the opening of an account is placed in a well known form of key controlled punching machine (Figs. 15 and 16) so that the data pertaining to the opening of an account will be punched thereon. The form of punching mechanism preferably employed in connection with the present system will be subsequently described in detail.

By the depression of the appropriate keys 9 (Figs. 15 and 16) the tabulating card placed in such punching mechanism will be punched to represent the account number and such numbers are obviously selected according to a serial order. Thereafter, the next card field is punched to represent the name of the depositor and in the next card field the address of such depositor. The card is also punched to represent the date of the opening of the account and the column for line selection is punched to represent "1", as shown in Fig. 2, to thereby cause the initial recording on the pass-book on the first line by means to be subsequently explained in detail. As previously stated, the field for the old balance is punched to represent zero.

Figure 7:
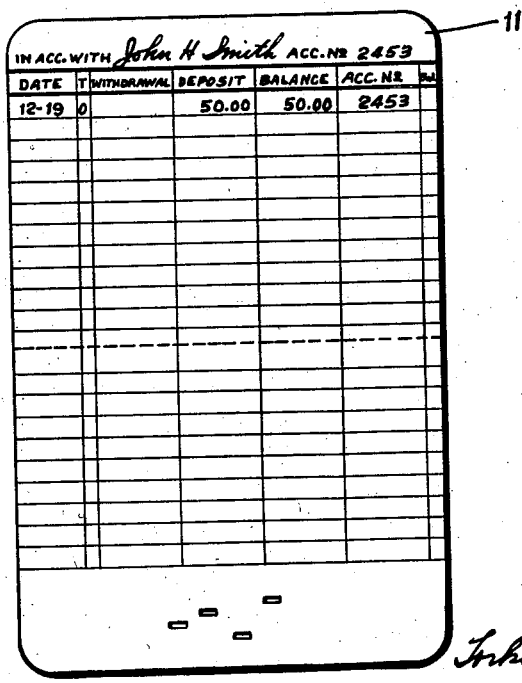
Fig. 7 is an illustration of a pass-book for a bank account printed by the present machine.

The pass-book 11 comprises a card folded in the center as illustrated in Fig. 7 by a dotted line and as shown therein the name of the depositor and the account number allocated to such depositor is written on the top. The pass-book is opened as shown in Fig. 7 and is inserted in the key controlled punching machine so that the lower part thereof is punched to represent the account number which is allocated to the depositor and in all transactions should conform to the account number punched upon the new and with each of the successively selected old balance cards 101 which are picked from the files as successive transactions are made for the depositor's account.

The above is a description of the preparation of the initial balance card and the pass-book for opening of an account. Thereafter, as will now be described, the balance card is placed in the machine shown herein and the pass-book is placed on a carriage therein so that by the manual movement of the carriage the latter will be moved to cause a card sensing operation so that the account number punched on the pass-book may be automatically compared column by column with the account number punched on the balance card. Since in the initial opening of an account there is little opportunity for lack of identity between a pass-book and the balance card, such a comparing operation for the initial account is not essential but as hereinafter described such identity for subsequent transactions must be preserved between the pass-book and the old balance transaction card and both should pertain to the same account.

*Card analyzing mechanism*

Figure 13:
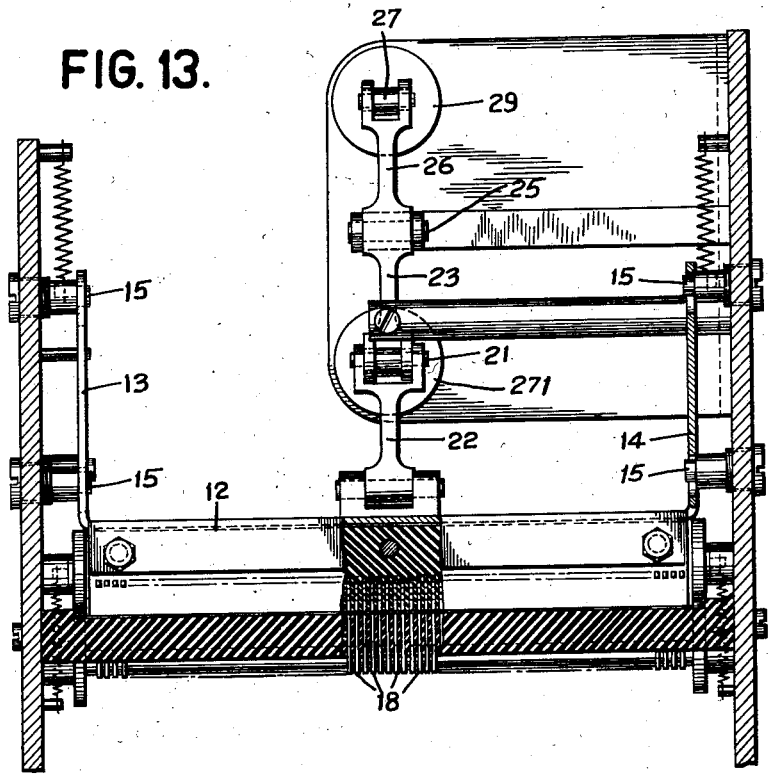
Fig. 13 is a plan view of the card analyzing mechanism and is taken on the line 13—13 of Fig. 6.

When the tabulating card 10 has been punched to designate data for the opening of a new account, the latter is inserted in the machine, as shown in Fig. 6, in order that the account number may be analyzed by analyzing mechanism now to be generally described. The analyzing mechanism for analyzing the card 10 is preferably of the type shown in and claimed in the application to T. E. Torkelson, Serial No. 117,282, filed December 23, 1936, and will only be generally explained herein and in connection with Figs. 6 and 13.

The assembly plate for the analyzing mechanism comprises a back plate 12 and a pair of integral side plates 13 and 14 which are provided with slots engaging guide pins 15 carried by the side frames of the machine whereby the movement of the analyzing frame is guided. Carried by the back plate 12 is an analyzing head which carries columns of spring contact elements 16, there being a vertical column of contacts 16 for each of the 80 columns of the card to thereby analyze the perforations therein. Each column of contact elements 16 has an electrical contact with a common conducting bar 17 and each contact 16 is adapted to pass through a perforation in the column and contact with a related contact point 18 There is, of course, one contact point 18 for each contact element 16 and groups of the latter are embedded in a fixed insulating member 19. The analyzing mechanism is shown in shifted or analyzing position in Fig. 6 and obviously in the normal position there is a space between the contact elements 16 and the contact points 18 so that the card 10 may be freely inserted therebetween until the lower edge of the card 10 rests upon a pair of card stops 20.

Connected at their ends by a pin 21 (Fig. 6) is a pair of toggle levers 22 and 23, the toggle lever 22 being connected at 24 to the analyzing frame and the toggle lever 23 is pivoted upon a fixed rod 25. Toggle lever 23 has an integral extension 26 which is connected by a pin 27 to the core 28 of an analyzing control magnet 29. When the magnet 29 is energized, the core 28 will be attracted downwardly to the position shown in Fig. 6 thereby rocking integral extension 26 of the toggle lever 23 clockwise until the point of the toggle levers 22 and 23 as the pin 21 moves upwardly past the center of the toggle system and until the toggle lever 23 abuts an adjusting screw carried by the stationary rod 30. This position of the toggle levers 22 and 23 will be maintained by a spring 31 connected to the lever 26 so as to retain the analyzing head in analyzing position. The means for causing the movement of the analyzing head to analyzing position is under control of an operating key 32 shown in the wiring diagram in Fig. 1b. This key is operable exterior of the machine and when depressed closes contacts 33 thereby closing the circuit to the magnet 29 through relay contacts 70a now closed and across a positive bus bar 34 and a negative bus bar 35. As previously, the energization of the magnet 29 causes the movement of the analyzing head and the contact points 16, associated with the columns in the card 10 which are perforated to represent the account, will pass through such perforations and make contact with the appropriate contact points 18 to thereby continue the closure of comparing circuits to be subsequently described.

*Pass-book carriage*

The pass-book carriage is shown in Figs. 6, 10, and 11 and as shown therein comprises a pass-book supporting plate 36 which carries lateral guide plates 37 and 38 slidable in longitudinal slots 39 (Fig. 10) formed in side frames 40, 41. By such guiding means, the carriage may be moved within the machine. The pass-book 11 is inserted in an aperture 42 (Fig. 11) formed by a pair of spaced stationary guide plates 43, 44 and the card is manually pushed on the card carriage to occupy the position shown in Fig. 11.

Figure 9:
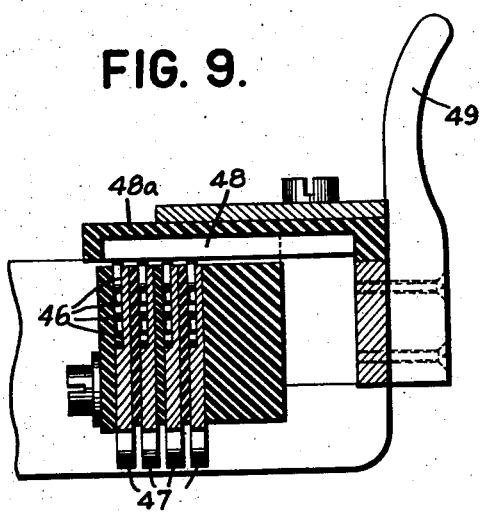
Fig. 9 is an enlarged view taken on the line 9—9 of Fig. 11 and discloses a section of the card analyzer carried by the pass-book carriage for analyzing the account number representing perforations in the pass-book.

The pass-book carriage is also provided with an analyzing mechanism for the four columns of account number data and is generally designated by 45 and is of substantially the same construction as that described in connection with the card analyzing mechanism and is so mounted upon the end of the pass-book carriage as to be correlated with the four columns of the pass-book which are punched to represent the account number. As best shown in Fig. 11, the pass-book analyzing mechanism comprises four columns of contacts 46 contacting with four contact bars 47 each common to a column of contacts. The contact bars 48 engageable by the contacts 46 through the perforations are, as shown in Fig. 9, carried by an insulating plate 48a attached to the pass-book carriage and this overhanging portion is adapted to firmly hold the pass-book upon the carriage. The spring contact elements 46 will, in the manner previously described, pass through the perforations and make contact with the correlated contact bar 48.

When the pass-book is placed upon the carriage, by means of a finger piece 49 secured to the carriage the carriage may be moved to the left as shown in Fig. 10. Dependently carried by the pass-book carriage is a plate 50 (see Fig. 6) which carries a series of insulated contact elements 51, 52 and 53 (see also the wiring diagram, Fig. 1b).

Figure 1A:
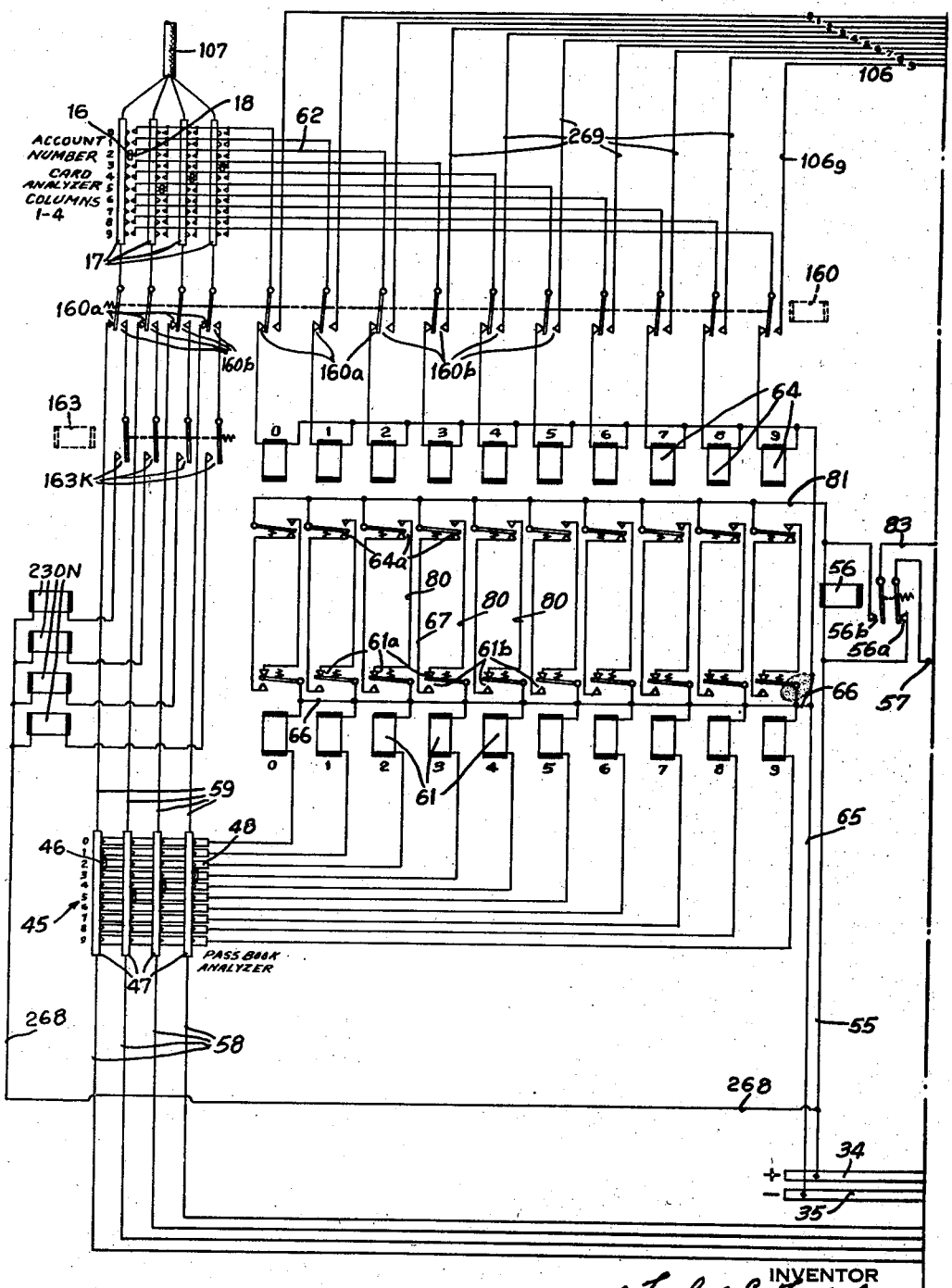

Referring now to the wiring diagram (Figs. 1a and 1b), it will be seen that, when the carriage 50 is manually moved to the left as shown in Fig. 10, the contact element 53 will successively contact four stationary contact elements 54 and thereby extend a circuit from the positive line side 34 (Fig. 1a) through a wire 55, relay contacts 56a, wire 57 (Fig. 1b) which is connected to the contact element 53. From the four contact elements 54 there are wire connections 58 which lead as shown in Fig. 1a to the common conducting bars 47 of the pass-book analyzing mechanism. The circuits also extend from the bars 47 by wires 59 and normally closed relay contacts 160a to the common conducting bars 17 of the card analyzing mechanism.

It will be observed that, when the account number perforation in the first column of the pass-book is analyzed, the circuit will lead from the positive line side 34, wire 55, relay contacts 56a, wire 57, contact 53, the first column contact 54, wire 58, common bar 47 for the first column, the contact element 46 passing through the perforations at the "2" position, the contact bar 48, and a wire to a relay magnet 61 and to the negative line side 35. The circuit will also be extended from the bar 47 for the first column by the wire 59, relay contacts 160a, common bar 17, the contact spring element 16 of the card analyzing mechanism which passes through the perforation at the "2" position, contact point 18, and thence by a wire 62 through normally closed relay contacts 160a and to a relay magnet 64, to the negative line side 35. If there is an identity in account number perforations on the pass-book and card, related magnets 61 and 64 will be simultaneously energized so that the relay magnet 61 will open relay contacts 61a. Relay magnet 64 when energized will open its relay contacts 64a. It will be seen, therefore, by the alternate position of the armatures of the corresponding relay magnets 61 and 64 that a circuit described as follows will be open: from the negative line side 35, through a wire 65, a wire 66, relay contacts 61b now closed, a wire 67 to the relay contacts 64a, which are now open, a wire 81 to a relay magnet 56, and to the positive line side by wire 55. This circuit will be open at the relay contacts 64a if the relay magnet 64 is energized simultaneously with the corresponding relay magnet 61. The alternate circuit between wires 66 and 81 including relay contacts 64b now closed and a wire 80 will be broken by the relay contacts 61a. In the event that there is similarity in the perforations in each of the four corresponding columns in the card and the pass-book, the corresponding relay magnets 61 and 64 are simultaneously energized. As the carriage is manually moved, the contact element 53 will engage the successive contact elements 54 thereby effecting a comparison between the perforations of corresponding columns of the pass-book and the tabulating card.

Figure 1B:
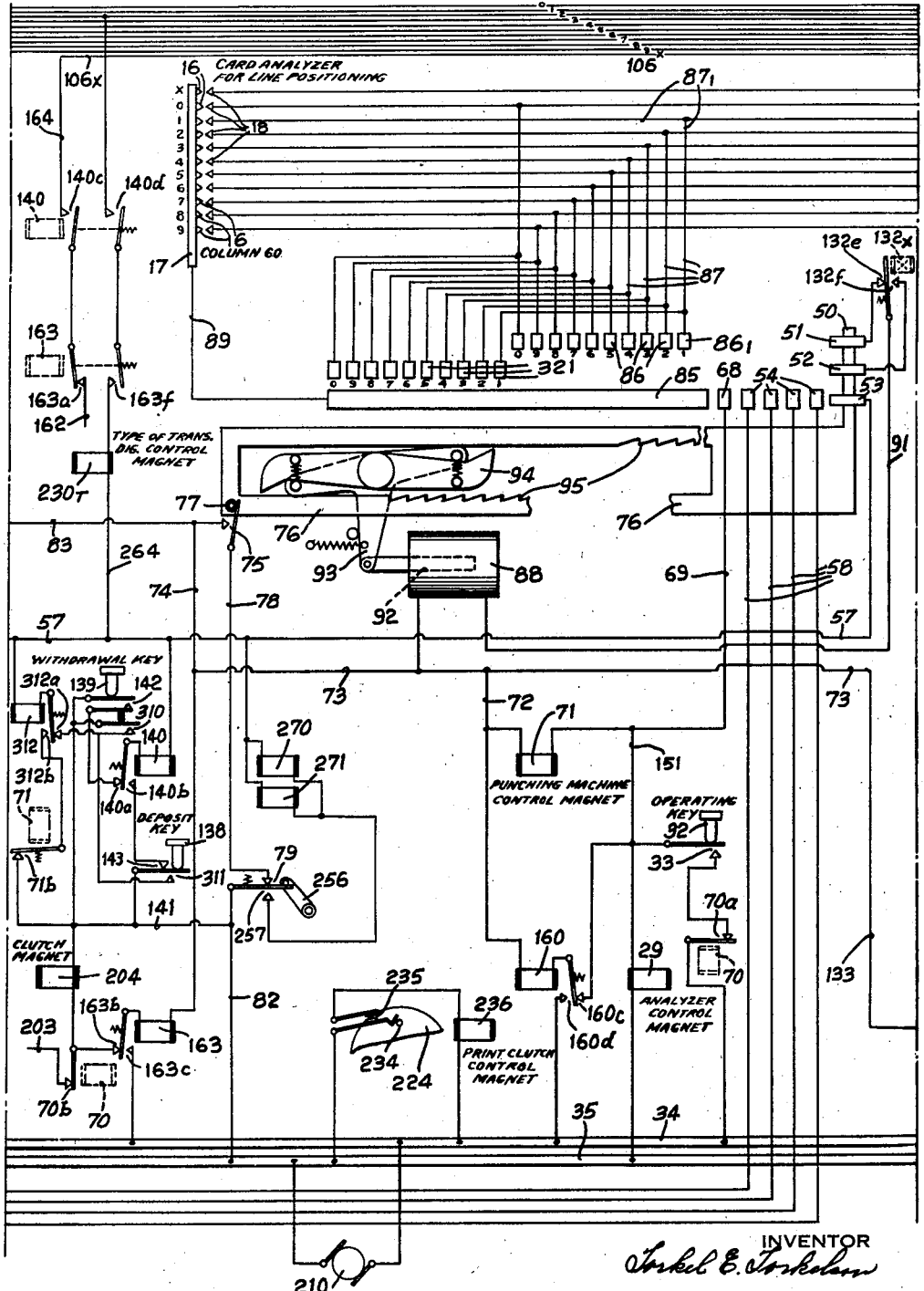

In the event that there is a proper identity in the account number analyzed on both the card and the pass-book the following circuit will be made: from the positive line side 34, wire 55, relay contacts 56a, wire 57, movable contact element 53, a stationary contact element 68, to a wire 69, a punch control magnet 71, a wire 72, wires 73 and 74 to contacts 75. As best shown in Figs. 1b and 10, the card carriage has attached thereto a ratchet toothed plate 76 carrying a roller 77 which in the initially moved position of the pass-book carriage permits contacts 75 to close thereby extending the circuit through the contacts 75 to a wire 78 thence to contacts 79 and a wire 82 to the negative line side. As will be subsequently explained, the energization of the punch control magnet 71 will cause automatic punching operations to be effected by a punching machine.

In the event that one of the perforations of the corresponding columns of the card and pass-book disagree, it will be seen that the normal closed position of relay contacts 61a or 64a for non-corresponding relay magnets 61 and 64 will be retained due to the fact that corresponding relay magnets 61 and 64 are not energized, thereby closing the circuit across the wires 66 and 81 by either a wire 67 or a wire 80 to cause the relay magnet 56 to be energized and open its relay contacts 56a and close its relay stick contacts 56b. The closure of the latter will extend the circuits from relay magnet 56 to a wire 83 (Fig. 1b) to contact 75 now closed, wire 78, contacts 79, wire 82 to the negative line side, thereby retaining magnet 56 continuously energized.

Summarizing, therefore, a dissimilarity in perforations in corresponding columns of the card and the pass-book will cause the relay magnet 56 to be energized and its relay contacts 56a to open and the stick relay contacts 56b to close. The last named contacts will retain magnet 56 energized so that, when the column contact 53 finally makes contact with the contact point 68, the above described circuit for the punch control magnet 71 will not be closed due to the previous opening of the contacts 56a. This will prevent the energization of the punch control magnet 71 and punching operations will not be instituted and which absence of operation will be recognized by the operator thereby indicating to the operator that the account numbers punched on the card and the pass-book are in disagreement.

*Means for determining the position of pass-book carriage for selection of line printing*

From Fig. 7 it will be observed that the pass-book is provided with twenty printing lines one of which may be selected under control of a perforation in the tabulating card so as to cause the stopping of the pass-book carriage when it is manually moved to the left (Fig. 10), to thereby correlate the selected printing line of the pass-book with recording elements which will be subsequently described. It will be recalled that in opening an account the first tabulating card 10 punched is punched in column 60 at the "1" index point position (see Fig. 2) so as to cause the selection of the first printing line on the pass-book. This is effected by means now to be described in detail.

It will be seen from Fig. 1b that in the movement of the pass-book carriage after the contact element 53 leaves the stationary contact point 68 the former will engage and contact with a stationary conducting strip 85 and the movable contact element 51 will thereafter make successive contact with a series of stationary contact points 86. The series of ten contact points 86 have related wire connections 87 to the ten stationary contact points 18 of the section of the card analyzer provided for analyzing the perforation in the line selecting column. Therefore, through the movable contact element 16 passing through the perforation at the "1" position and contacting with the contact point 18 a circuit will be closed when the movable contact element 51 strikes the contact elements 86₁ which has a wire connection to the contact element 18 correlated with the "1" index point position of the line selecting column. This will cause an energization of the carriage stop solenoid 88 by a circuit now to be described. This circuit extends from the positive line side 34 (Fig. 1a), wire 55, relay contacts 56a which are closed if there is an agreement in the account numbers of the pass-book and tabulating card, wire 57 to the contact element 53 (Fig. 1b), common conducting strip 85, a wire 89 to the common bar 17, the contact points 16 and 18 contacting through the perforation at the "1" index point position, the wire 87₁, contact point 86₁, contact element 51, relay contacts 132e now closed, wire 91, to the solenoid 88, and from the solenoid to the wire 73, the wire 74, contacts 75 now closed, wire 78, contacts 79, and a wire 82 to the negative line side 35.

Since it is assumed that the "1" index point position is perforated in the line selecting column of the tabulating card, the pass-book carriage will be stopped at a predetermined position which is selected by the energization of the magnet 83. As best shown in Figs. 1b and 10, the energization of the magnet 88 will draw within its core 92 and rock a T-shaped member 93 so as to cause a double pawl 94 having a spring connection therewith to engage upper and lower ratchet teeth 95 of the plate 76. The upper and lower ratchet teeth are oppositely formed so that in coaction with the double pawl they will prevent further movement of the pass-book carriage to the left or its restoration to the right. The carriage is now held in such a position that the subsequent recording operation on the pass-book will be effected on the first line of the pass-book as will be later explained.

It will also be clear that, if the account numbers are not in agreement, contacts 56a will be opened and the circuit to the solenoid 88 will not be completed permitting the pass-book carriage to be moved entirely within the machine and then restored by a return spring. The failure to stop the carriage during its movement and its full restoration will also be an indication to the operator that the account numbers on the tabulating card and pass-book are in disagreement.

*Punching machine*

Figure 15:
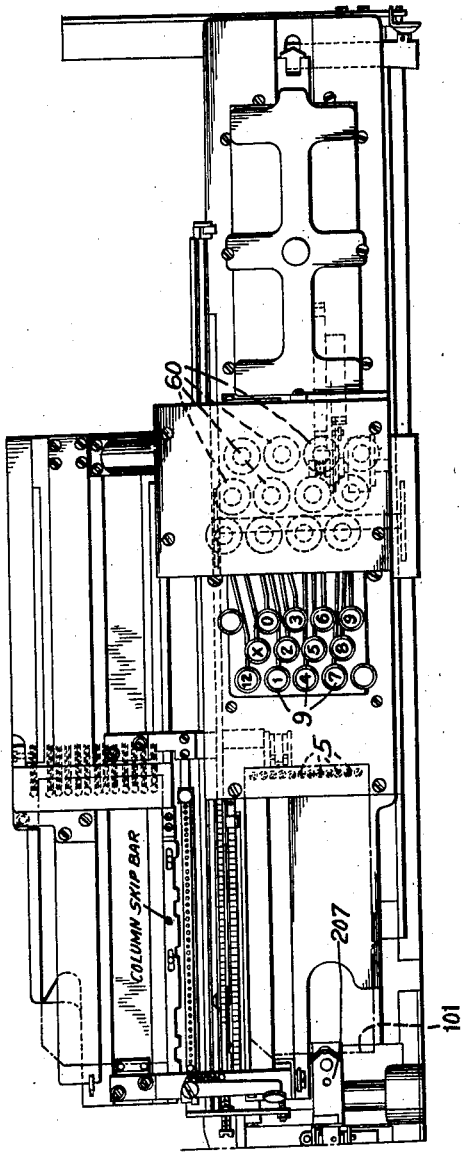
Figs. 15 and 16 are plan and side elevational views of a well known form of punching machine used in connection with the present invention.
Figure 16:
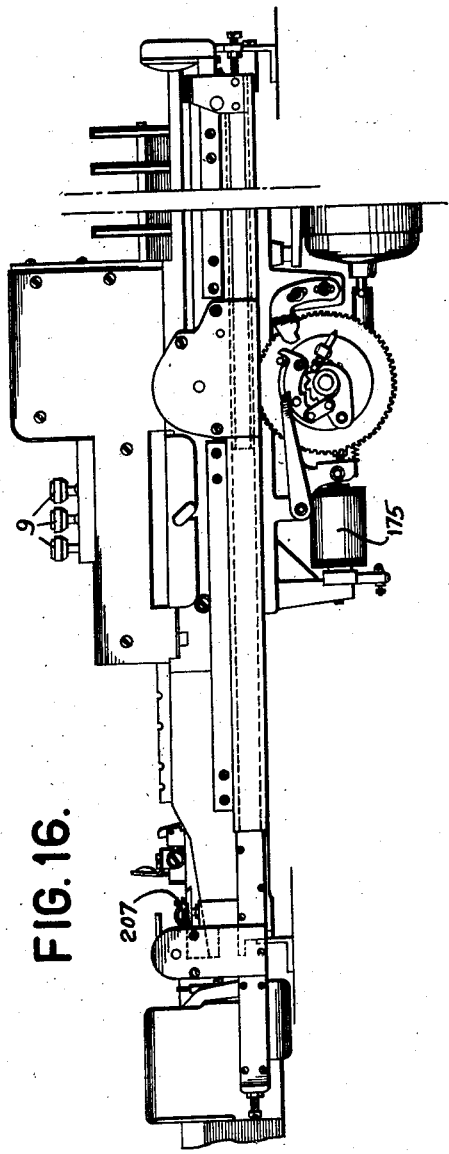

The punching machine shown herein in Figs. 15 and 16 is of a type well known in the art and is fully shown and described in the patent to F. Lee et al., No. 1,976,618, dated October 9, 1934. Only so much as is necessary to understand its coordination with the present improvements will be explained.

From Figs. 15 and 16 it will be seen that the punching machine is provided with keys 9 corresponding to those of the patent for manual punching operations to punch the initial tabulating card 10 for opening an account.

One of the functions of the punching machine is to automatically reproduce on a blank card in the machine the data on 67 columns of the tabulating card 10 (Fig. 2) to thereby produce a duplicate card shown in Fig. 3. This card 101 comprises the first balance card if a deposit is made.

Figure 1C:
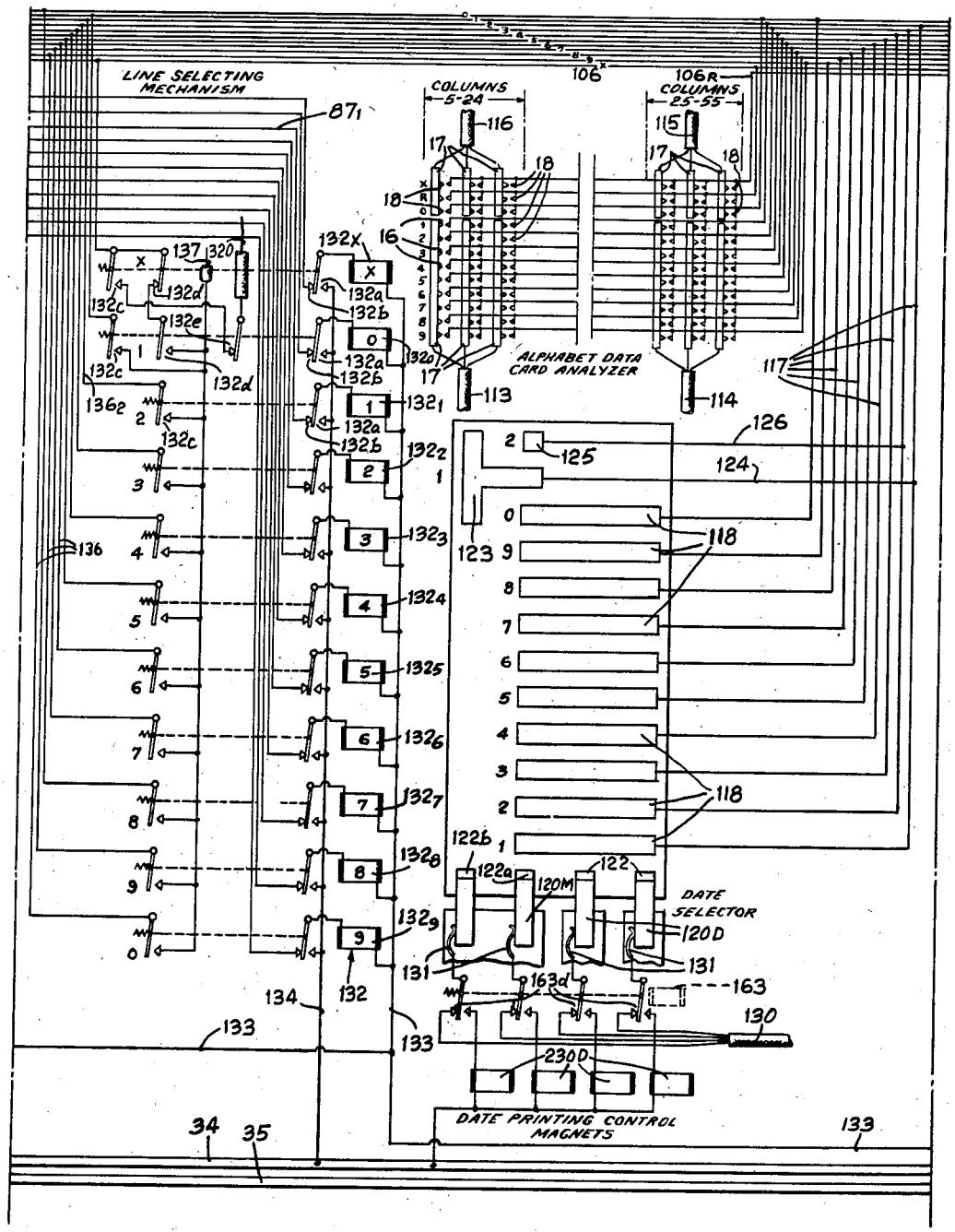
Figure 1D:
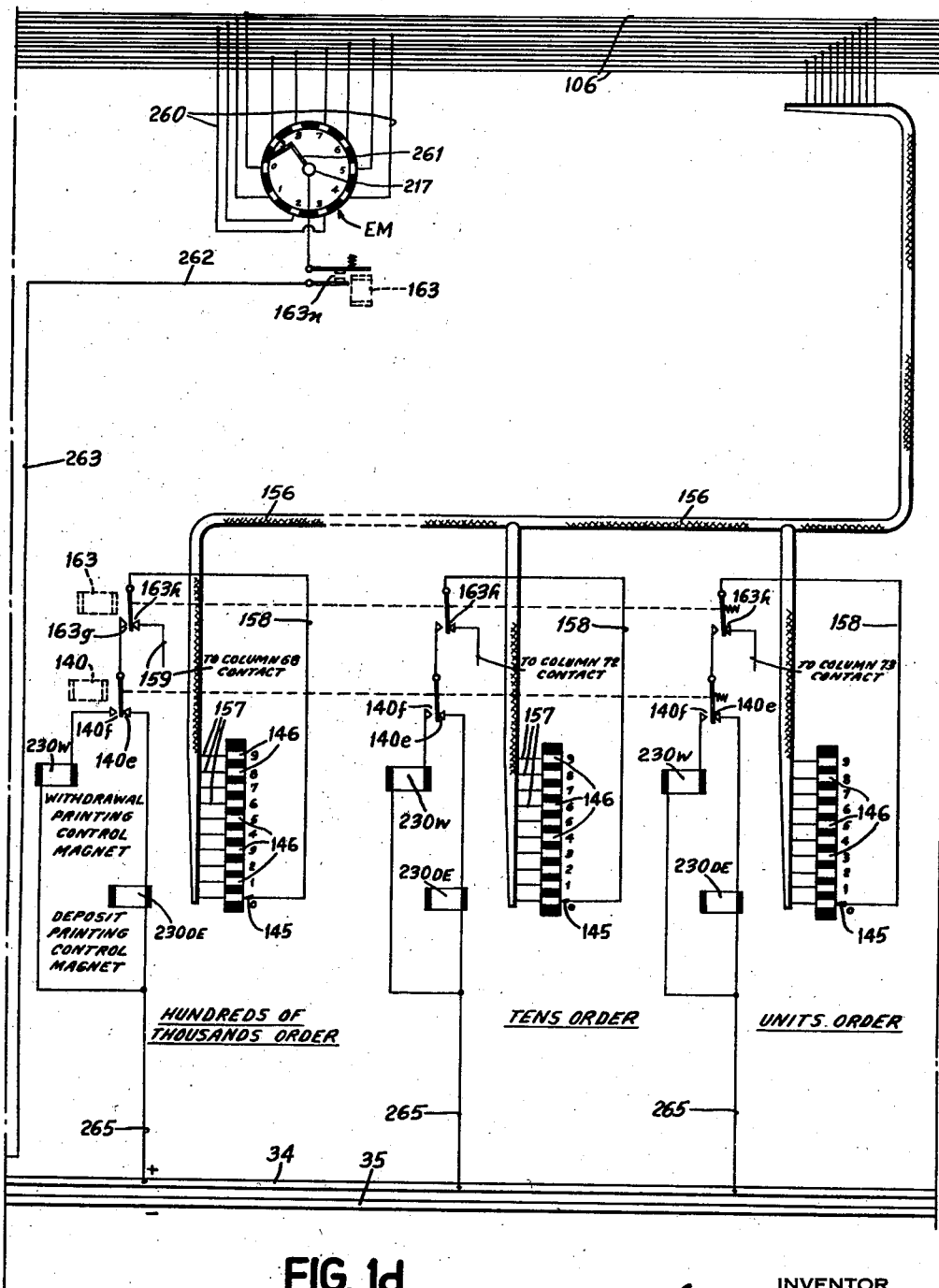
Figure 1E:
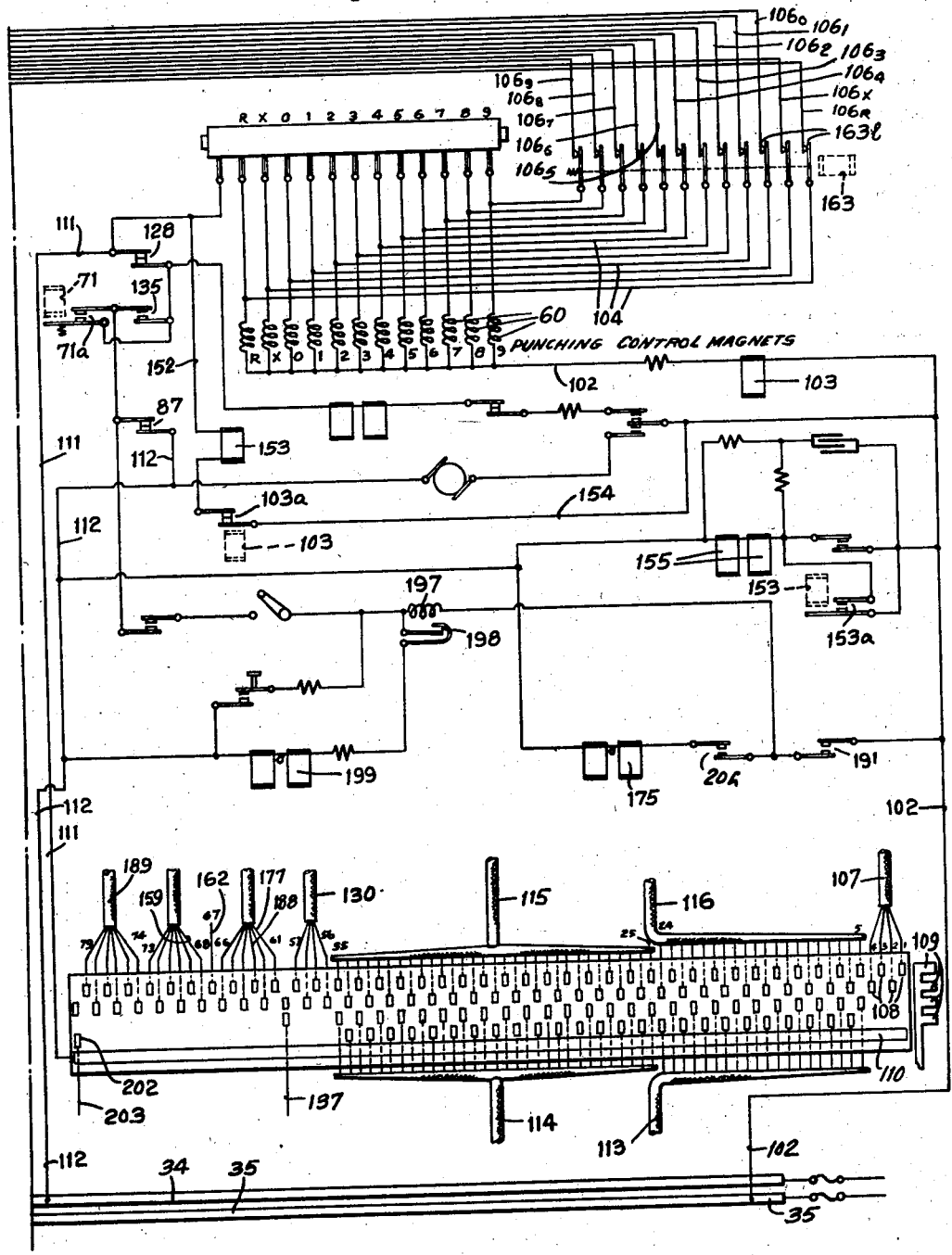

It will be recalled from Fig. 1b that the punching machine control magnet 71 is energized to initiate punching operations so as to cause the closure of relay contacts 71a (Fig. 1e). At the same time relay magnet 160 (Fig. 1b), which is in parallel with relay magnet 71, will through its relay contacts 160c also be energized to thereby close its stick relay contacts 160d, providing a stick circuit for relay magnet 160 from the positive line side 34, relay contacts 160d, relay magnet 160, wires 72, 73 and 74, contacts 75 now closed, wire 78, contacts 79, wire 82 to the negative line side 35.

Relay contacts 160a (Fig. 1a) are now opened so these relay contacts 160a disconnect the part of the card analyzer shown in Fig. 1a from the wires 59, and from the magnets 64 to prevent any false circuits possible.

The punching control magnets 60 (see Fig. 1e) correspond to those in the aforementioned patent and are successively selected as the perforations in the tabulating card 10 in the columns representing the account number are analyzed.

It will be seen that the negative line side 35 is connected to a common side of the punch control magnets 60 by a wire 102 through a relay magnet 103 to be subsequently referred to.

From the magnets 60 there are twelve wire connections 104 connected to twelve corresponding digit selecting wires $106_0$, $106_9$, $106x$ and $106_R$, through normally closed relay contacts $163_1$. The wires 106 terminate as shown in Fig. 1e with connections to the wires 104 through the relay contacts $163_1$ which are now closed. The digits 0–9 aside of a contact point or any line indicates its digital representation while "X" and "R" signify punching at the "11th" and "12th" positions of the tabulating card, respectively. Obviously, for each analyzer section the contact element 18 which engages the related contact element 16 through the perforation in that column will select the appropriate punch control magnet 60. From the four common bars 17 of the account number card analyzer (Fig. 1a) there are connections to four wires in a cable 107 which are connected to contact points 108 (Fig. 1e) carried by a stationary strip of a column selector. With these contact points 108 a column selector contact element 109 carried by the card carrying carriage will make successive contact therewith and also with a common conducting strip 110. From the strip 110 the circuit to the positive line side to energize a selected punch control magnet 60 is through a wire connection 111, to contacts 128 now closed, relay contacts 71a now closed, contacts 87 now closed, and a wire 112 to the positive line side 34.

It is explained that due to the previous positioning of a card 101 to the punches 5 (Fig. 15) the carriage has skipped under control of a column skip bar (identified in Fig. 15 as "column skip bar" and corresponding to the bar 152 in the Patent No. 1,976,618) to the first column punching position at which time contacts 135 (Fig. 1e) (which are the same as in the patent) are opened through a high part of the skip bar.

The column selector 109 is now positioned over the first column contact of the strip so that, when relay contacts 71a are closed, punching for the first column is effected and automatically continued because the low part of the skip bar will permit contacts 135 to be retained closed.

The column selector shown at the bottom of Fig. 1e, comprising in part elements 108 and 109, is well known in the art and is fully described in the patent to G. F. Daly et al., No. 2,016,706, dated October 8, 1935.

The means for causing the operation of the punches 5 (Fig. 15) under control of the punch magnets 60 is also well known and is fully described in the patent to Lee et al., No. 1,976,618.

After punching the first balance card 101 with the account number analyzed on the card 10, successive punching operations occur to punch the alphabet data in columns 5—55 of the tabulating card 10 from the alphabet data analyzer shown in part in Fig. 1c.

To this end there are suitable cable connections to the column selector from the common bars 17 of the alphabet data analyzer and in this instance the bars 17 are split so that the index points 1–9, inclusive, are related to the lower part of the bar 17 and index points X, R, O are related to the upper part of the same bar 17. This is necessary in view of the punching of the perforations in code to represent alphabet data. The twelve wires $106_0$—$106_9$, $106x$, $106_R$ are also multiplied to the sets of contacts 18 for the selection of magnets 60. Cables 113, 114 (Fig. 1c) from the alphabet analyzer are connected to lower contact points on the column selector as shown in Fig. 1e. The cables 115 and 116 (Fig. 1e) from the upper contact points 108 of the column selector are connected to the upper parts of the bars 17, as shown in Fig. 1c. Punching operations will thus continue automatically and where necessary two punch control magnets 60 are energized for code punching in a single column.

Figure 8:
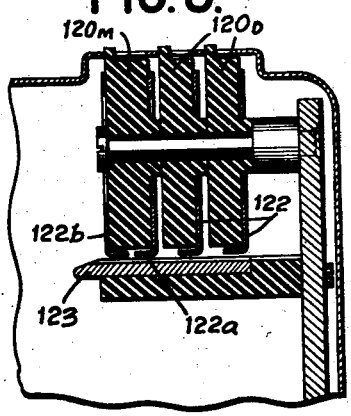
Fig. 8 is a cross-sectional view of the date setting wheels and is taken on the line 8—8 of Fig. 11.

The next punching operation comprises punching in columns 56—59 of the date on which the transaction occurred and the date setting mechanism is shown in Figs. 8 and 11 and in the wiring diagram in Fig. 1c.

Columns 56 and 57 are appropriated for the punching of a number indicating the twelve months and columns 58 and 59 for the date of such month.

The ten digit selecting wires $106_0$—$106_9$ leading from the ten control magnets 60 are connected to ten wires 117 (Fig. 1c) and the latter are individually connected to ten commutator segments 118 formed in an arcuate insulating ring 119 (see Fig. 11).

Date setting wheels 120 settable exteriorly of the cabinet carry brushes 122 adapted to contact with the segments 118. The two date setting wheels 120D at the right (Fig. 8) are set to represent any date from 1–31 and coact with the ten segments 118 (Fig. 1c) to cause the selection of the punch control magnets 60 to cause the date punching. The month date setting wheel 120M has a brush 122a adapted to contact with the ten segments 118 to cause the selection of the punch control magnets 60 for the punching of the months by perforations at the 1–9 index point positions. At the tenth month position of the wheel 120M the brush 122a coacts with the "0" segment 118 and a brush 122b of the other wheel 120M coacts with a segment 123 which has a wire connection 124 to cause the selection of the "1" punch control magnet 60. At the eleventh month position both brushes 122a and 122b contact the segment 123, and at the twelve month position the brush 122b contacts with the segment 123 and brush 122a contacts with a segment 125 having a wire connection 126 to select the "2" punch control magnet.

Against each ring 127 (Fig. 11) carrying a brush 122 bears a contact plate 131 and the four contact plates 131 have wire connections to wires in a cable 130 through normally closed relay contacts 163d. The cable 130 connects as shown in Fig. 1e to contact points of the column selector for columns 56—59.

The next automatic punching operation is to punch a perforation in column 60 to represent the next line to be selected on the pass-book for recording. This is necessary because the first balance card will be used in the subsequent transaction just as the initial tabulating card was and, therefore, the next or second printing line of the pass-book must be selected. In the initial account the perforation was at the "1" index point position and under control of this perforation the first balance card 101 will be punched at the "2" index point position (see Fig. 3) by means now to be described.

When the pass-book carriage is moved to a line selecting position, a selected one of a series of relays 132 (Fig. 1c) is set up under control of the analyzer for the line selecting column. In the example assumed, for the "1" index point perforation a circuit described as follows will be completed to a relay magnet 132₁ (Fig. 1c). From the positive line side 34 (Fig. 1a) wire 55, relay contacts 56a, wire 57 (Fig. 1b) contact element 53, contact strip 85, wire 89, common bar 17, contacts 16 and 18 engaging through the perforation at the "1" index point position, wire 87₁, to relay magnet 132₁ (Fig. 1c) through its relay contacts 132b, and by a common wire 133 for said magnets 132 to a wire 73 which leads to the negative line side 35 as previously described. The relay magnet 132₁ will close its relay contacts 132a to provide a stick circuit by a wire 134 to the positive line side 34. Relay contacts 132c will also close and by a wire connection 136₂ connected to the desired wire 106₂ a punch control magnet 60 will be selected for energization which will cause punching of the next higher index point position, or at the "2" index point position in the example assumed. Therefore, if an old balance card is punched from either 1 to 8, the next higher index point positions, or 2—9, will be punched on the next balance card, effected by the appropriate wire connection between the wires 106 and the wires 136.

To complete the circuit to the selected punch magnet a common conducting wire 137 for the relay contacts 132c (Fig. 1c) is connected as shown in Fig. 1e to the lower contact point for the column selector at the 60th column.

Later there will be described the means for changing the punching from "9" to represent "10" at the line selecting column on the next balance card, etc.

Thereafter, under control of the card analyzer for columns 61—66 the punching operations continue to represent by perforations on the new balance card the old balance on the previous balance card and which for an initial account is —000000—. In view of the fact that such punching involves mechanism to be later described the specific manner in which this is accomplished will be later described. At the 67th card column position the high part of the skip bar opens contacts 135 to stop the punching operation at this card column.

*Setting up amounts for withdrawal or deposit*

The amount which is deposited or withdrawn is set up in the machine after the punching machine has duplicated data and punched other data to represent a new balance card. When the punching operation is terminated either a deposit key 138 (Fig. 1b) or a withdrawal key 139 is depressed; depending on the transaction.

If key 139 was previously depressed, a circuit to a magnet 140 is closed and held closed by the following described circuit: from the negative line side 35, wire 82, wire 141, contacts 142 closed by key 139, relay contacts 140a, relay magnet 140, to wire 57 which leads as previously described to the positive line side 34. Relay contacts 140b are stick circuit contacts closing a stick circuit through contacts 143 opened by the key 138. Due to the previous locked up circuit of the relay magnet 140 it is necessary to depress the deposit key 138 to open the stick circuit by opening of contacts 143. Since for the example assumed the initial amount is a deposit of $50.00, the deposit key 138 is depressed.

From Fig. 1b it will be seen that the deposit key 138 is adapted to close contacts 311 and that the withdrawal key 139 is adapted to close contacts 310 both of which extend the circuit from the negative line side 35 to wire 82, wire 141 through either contacts 310 or 311 through relay contacts 312a to a relay magnet 312, thence to wire 57, and through relay contacts 56a (Fig. 1a) wire 55 to the positive line side 34. A stick circuit to the negative line side 35 is effected by stick relay contacts 312b, relay contacts 71b now closed, and wires 141, and 82.

*Withdrawal or amount setting means*

Figure 14:
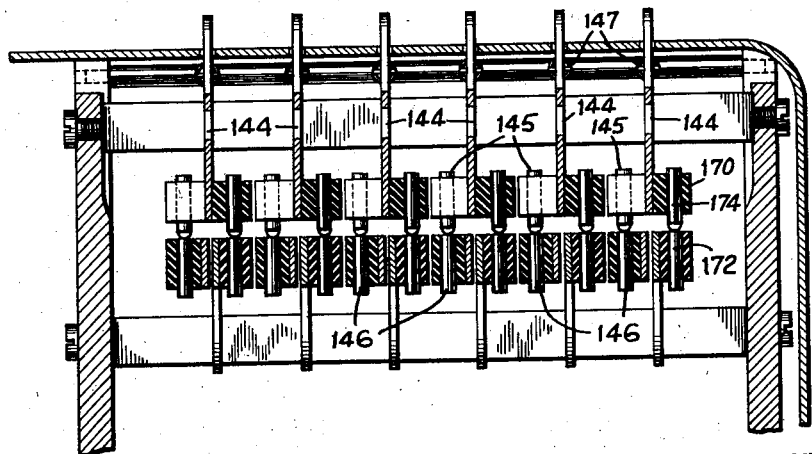
Fig. 14 is a transverse sectional view of the setting slides and is taken on the line 14—14 of Fig. 11.

The amount setting means for entering the withdrawal or deposit amounts in the machine comprises a series of six slides 144 which as shown in Figs. 11 and 14 are manually settable exteriorly of the machine. Each slide 144 at the left side thereof carries a single contact element 145 (Fig. 12) which is positioned for cooperation with one of a series of ten contact points 146 dependent upon the digit positioning of the slide 144. Each slide 144 is manually drawn towards the operator against the action of a spring 147 and the differential position of the slide is maintained by a retrograde preventing pawl 148 (Fig. 11) engaging a ratchet tooth 149 of the settable slide 144. If an error has been made in setting the slide, a projecting portion 150 of the retrograde preventing pawl 148 is manually moved to disengage the pawl from the ratchet teeth 149 whereupon the slide may be reset to the desired position. If any digit of the amount entered in the machine should represent zero, the slide is left at the normal position but for other digits the slides are moved toward the operator to selected digit representing positions which may be indicated to the operator by means of an index plate adjacent the slides.

Since the initial deposit is assumed to be $50.00 the slide for the tens of dollars order is set to the "5" digit representing position. After the amounts have been set up as just described, the operating key 32 (Fig. 1b) is again depressed which will close the circuit from the positive line side 34 through relay contacts 70a now closed, contacts 33 closed by the operating key 32, and thence by a wire 151 to the punching machine control magnet 71 and the circuit then extends by the wire 72, 73, 74, contacts 75 and 79 and wire 82 to the negative line side 35. As previously stated, the energization of the relay magnet 71 will close its relay contacts 71a shown in Fig. 1e to thereby cause as previously stated the automatic operation of the punching machine so as to now punch on the new balance card certain data in columns 67 to 79.

*Operation of punching machine continued*

When the operation of the punching machine is resumed, the indication of the type of transaction is punched upon the new balance card in column 67 and by the following described means and such means is operative only if the amount entered is a withdrawal.

Since in the example assumed the first transaction is a deposit, no punching will be effected in column 67 and since no punching control magnet 60 will be energized, it is, of course, necessary to provide additional mechanism so as to cause the automatic spacing of the carriage to the next column punching position. This arrangement is also effective in alphabet punching where certain columns are not punched. Such an arrangement is well known to those skilled in the art and is fully shown and described in the patent to W. F. Gutgesell, No. 1,939,049 and for this reason is only generally described herein.

In this instance, the following described circuit will be closed: from the positive line side 34 (Fig. 1e), wire 112, contacts 87 now closed, relay contacts 71a now closed, contacts 128 now closed, wire 152 to a relay magnet 153 and thence to relay contacts 103a which are now closed because relay magnet 103 which is in series circuit with the punch control magnet circuits is not energized and thence by a wire 154 to the negative line side 35. The energization of the relay magnet 153 will cause the closure of relay contacts 153a thereby causing the punch magnet 155 to be connected across the positive and negative line sides and therefore energize in the same manner as it is energized by the circuit connections described in the aforementioned patent to F. Lee at al., No. 1,976,618. It is pointed out that the punch magnet designated by reference numeral 155 herein corresponds to the punching magnet in the last mentioned patent and designated therein by reference numeral 49.

By the above described mechanism the carriage will be moved to the extent of a single column so that the amount of the transaction may next be automatically punched in columns 68 to 73 by the following described mechanism.

There is shown diagrammatically in Fig. 1d the electrical connections for causing the selection of the punch control magnets 60 under control of the amount setting slides 144 but only for three orders thereof in view of the duplicate arrangement for the six denominational orders. Taking into consideration the hundreds of thousands order, which is the first order to be punched, it will be seen that connected to the ten wires 106o—106g which are connected to the punch control magnets 60 for punching at the index point positions zero to nine inclusive, there is a cable connection to such wires and such cable is designated by reference numeral 156 (see Fig. 1d). These ten wires 157 in the cable 156 as shown in Fig. 1d are connected to the series of ten stationary contact points 146. The movable contact point 145 correlated therewith has a wire connection 158 to a wire 159 through closed relay contacts 163h. The wire 159 leads as shown in Fig. 1e to a contact point of the column selector appropriated for the 68th column position and the particular control magnet 60 which will be selected for energization will, of course, be dependent upon the differential position of the slide 144 and the corresponding correlation of the movable contact point 145 with one of the stationary contact points 146. Thereafter, the carriage is stepped step by step and the digit amounts set under control of the remaining slides 144 are read out by the column selector as the carriage moves step by step.

At the termination of such card punching operations, columns 68 to 73 will be punched to represent the amount of the transaction and in the example assumed only the slide 144 of the tens of dollars order will cause punching of "5" and the number punched will be indicated as $50.00.

*Means for punching the new balance card to indicate a withdrawal if the transaction should be a withdrawal*

It will be observed from Fig. 1b that in such instance the withdrawal key 139 is pressed to cause energization of the relay magnet 140 which upon its energization causes the closure of contacts 140c. From the column selector contact for the 67th position, there is a wire connection 162 (see Fig. 1e) which is connected as shown in Fig. 1b to normally closed relay contacts 163a. From the relay contacts 163a there is a wire connection to the relay contacts 140c and from the last mentioned contacts there is a wire connection 164 to a wire 106x which leads to the punching control magnet 60a for causing the punching at the "X" index point position. Therefore, if the entry should be a withdrawal the card will be punched in the 67th column to indicate this fact on the new balance card.

*Punching of new balance*

After columns 68—73 have been punched to represent the deposit or withdrawal amount, there is a selection of punch control magnets 60 to automatically punch the new balance and is dependent upon the old balance punched on the card analyzed and the setting of the control slides 144 to represent the deposit or withdrawal. This joint cooperation involves a number of circuits not shown herein as it forms no part of the present invention and is fully disclosed in the parent application. The punching of a new balance is shown in Fig. 3 in columns 74—79 and thereafter the punch carriage skips to column 80.

In the present example there is no punching in the 80th column and the carriage is automatically escaped to this column and thereafter, by carriage controlled means fully shown in the patent to Lee et al., No. 1,976,618, contacts 191 in Fig. 1e will be closed. This will cause the energization of the relay 197 and the closure of its relay contacts 198 and the energization of the ejection magnet 199. This causes the operation of the ejector 207 (Fig. 15) to eject the punched card whereupon contacts 201 will be closed to cause the energization of the clutch control magnet 175 (see Figs. 15 and 16) which by means shown in said patent will cause a new card to be fed to the punches and the restoration of the card carriage to the first column position. The numerals 175, 191, 197, 198, 199, 201 herein identify the same elements as in the last named patent and the operation is the same as disclosed therein.

*Printing mechanism*

There will now be described the means for printing, as shown in Fig. 7, upon the pass-book the date of the transaction, the type of transaction, the withdrawal or deposit amount, and the account number.

When the column selector contact reaches the 80th column it strikes a contact 202 closing the circuit from the positive line side 34 to a wire 203 (Fig. 1e) connected as shown in Fig. 1b to relay contacts 70b now closed, the circuit then extending to relay contacts 163b now closed, through the relay magnet 163, to the wire 74, contacts 75 now closed, contacts 79 now closed, and wire 82 to the negative line side 35 thus causing the energization of the magnet 163. The stick contacts 163c of the magnet hold the circuit of the magnet 163 to the positive line side 34.

A circuit is also extended by the wire 203 (Fig. 1b) to a clutch control magnet 204, connected by wires 141 and 82 to the negative line side 35.

The printing mechanism shown in this application is substantially the same as that disclosed in applicant's application Serial No. 99,561, filed September 5, 1936. For this reason only sufficient description thereof is given herein to understand its general operation.

As shown in Fig. 1b, an electric motor 210 is shunted across the positive line side 34 and negative line side 35 for continuous operation. The speed of the motor 210 is reduced by a speed reduction drive comprising a worm screw 213 and a worm wheel 213a (Fig. 6) in a casing 211 (Fig. 10). The shaft 212 driven by the motor rotates the worm screw 213 meshing with the worm wheel 213a (Fig. 6) attached to a constantly rotating shaft 214 to which is attached a ratchet wheel 215. The magnet 204 controls a one-revolution clutch mechanism of usual form and designated generally by numeral 216 in Fig. 17, thereby clutching the ratchet wheel 215 to a drive shaft 217.

As shown in Fig. 10, the shaft 217 is square in section and mounts by a spring connection 218 each of a series of toothed wheels 219. Each wheel 219 has an impositive clutch connection to a related type wheel 221 comprising a pair of spring pressed pawls 220 mounted on the related type wheel 221. A series of these type wheels are carried by the shaft 217 and thereby rotate with the shaft until their rotation is stopped after which the shaft 217 rotates for the rest of its revolution. The type wheels 221 are individually locked against clockwise rotation by pawls 222 pivoted at 223.

At the initial clockwise rotation of the shaft 217 a cam 224 (Fig. 17) attached thereto will by its high portion 225 rock a follower arm 226 and a shaft 227. To said shaft there is secured a bail rod 228 which engages extensions of the pawls 222 and rocks the latter so as to be released from the zero stops 229a of the type wheels 221. The zero stop 229a is longer than the stops 229 for the digits 1-9 of each type wheel so that the type wheels are now free to rotate with the shaft 213 since the stops 229 for selecting digits 1-9 are clear of the pawls 222.

By means of an emitter to be later described, impulses are transmitted at differential times to type selecting magnets 230 to thereby attract its armature 231 and draw a link 232 to the left, said link being pivoted to a latch arm 233. The latter is thereby rocked to unlatch the pawl 222 which is then rocked by a spring to engage the stop 229 which is in engagement with the pawl 222 at the time the impulse is transmitted to the magnet 230. In this manner the type wheels are stopped at differential positions and if they are not stopped they rotate to their zero positions for printing of zeros.

At this time mechanism comes into operation to cause printing from the gang of type wheels 221 by the following described mechanism.

Figure 17:
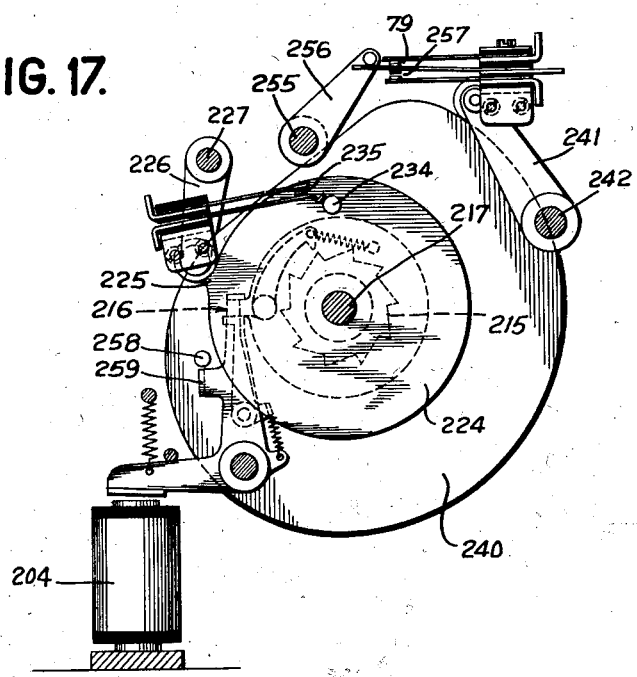
Fig. 17 is a sectional view of a one-revolution clutch mechanism and is taken on the line 17—17 of Fig. 6.
Figure 18:
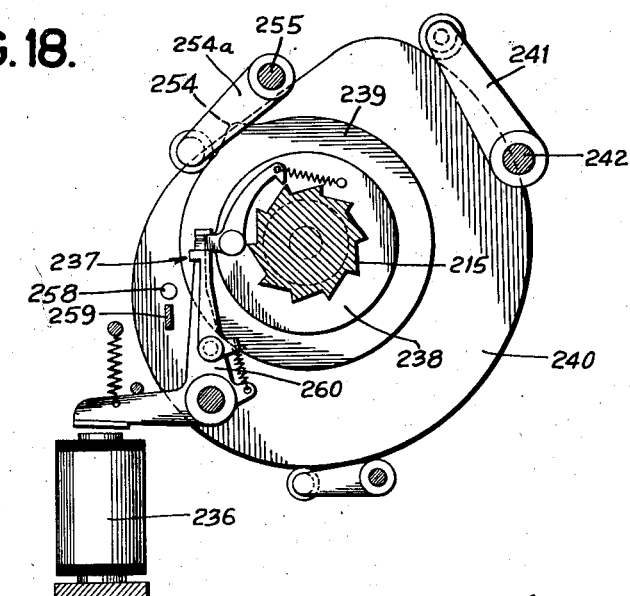
Fig. 18 is a sectional view of another one-revolution clutch mechanism and is taken on the line 18—18 of Fig. 6.

Near the end of the cycle of rotation of shaft 217, a pin 234 (Fig. 17) carried by the cam 224 will close contacts 235 thereby causing as shown in Fig. 1b the energization of a print clutch control magnet 236, shown in Fig. 18 as causing the operation of a one-revolution clutch mechanism 237 to clutch the ratchet wheel 215 with a disk 238 to which is attached a pair of cams 239 and 240, which are rotated in a clockwise direction as viewed in Fig. 18.

As the cam 240 rotates, a spring urged follower arm 241 will engage the lower part of the cam and thus rock a shaft 242 to which the arm 241 is secured. To the shaft 242 there is secured a frame comprising a bail rod 243 (Fig. 10) which in the counterclockwise rotation of the shaft 242 engages a series of latch arms 244 to rock them and disengage said latch arms 244 from hammers 245. The latter are urged by their springs 246 to strike the series of printing wheels 221 and depressing them as they are guided by the square support shaft.

Any suitable inking medium may be utilized to effect the impression upon the pass-book from the printing type.

To accomplish zero elimination in the orders higher than the digit of the highest denominational order zero suppression bell cranks 247 are loosely pivoted upon a rod 248 and one arm thereof enters a notch 250 in the zero position of a type wheel 221. This causes a hook formed on one arm of the bell crank 247 to engage a lug 251 which is integral with an extension of a related hammer 245. By this means printing of zeros in undesired orders are prevented.

For zero insertion to print zeros in orders lower than the digit of the highest denominational orders, the usual carry-over is provided and comprises a lug 252 for each latch arm which reaches over to the lug of the latch arm of the next higher order. The lugs 252 overlap the arms of the bell cranks 247 in such a manner that, if a hammer 245 is operable to print a digit other than zero, the lug 252 of its latch arm 247 will be held up because the arm 247 thereof will not enter the recess 250. This lug 252 being beneath the lug 252 of the bell crank 247 of the next lower order will retain this bell crank elevated and, since its arm is prevented from entering the recess 250 of the type wheel, the related hammer 245 will be released and print a zero thereby filling in the desired zero.

At the end of the rotation of the cam 240, the cam will restore the bail rod 243 (Fig. 10) and reversely rock the hammers 245 so that they are relatched by the latch arms 224. A bail rod 253 attached to the shaft 242 will rock the latch arms 247 and hold them in the normal position shown in Fig. 10.

At the termination of the clockwise rotation of cam 239 (Fig. 18) the high portion 254 of the latter will rock a follower arm 254a and a shaft 255 to which the follower arm 254a is secured. To the shaft 255 there is secured a contact controlling arm 256 which is thereby rocked to open contacts 79 and close contacts 257. The result of this will be explained later.

From Fig. 17 it will be seen that, as the cam 240 terminates its clockwise rotation, a pin 258 carried thereby will engage a lug 259 and rock the usual clutch control arm carrying the lug 259 just as it is rocked by the energization of the magnet 204. A second revolution of shaft 217 will now be effected and the latter will restore the differentially rotated printing wheels 221 to zero.

As best shown in Fig. 17, as the shaft 255 was rocked, a frame attached to the shaft 255 will by its bail rod 249 (Fig. 10) engage all the previously unlatched pawls 222 to cause them to be relatched on in position to engage with the zero stops 229a to thus stop the type wheels 221 in their zero positions as they are restored to zero by the rotation of shaft 217.

The various printing control circuits will now be described so that the means for causing the energization of the various sets of printing control magnets 230 will be understood.

The data printed comprises as shown in Fig. 7 at the left of the illustrated pass-book the date and which data is printed in four columns on the pass-book under control of the four date printing control magnets 230D (Fig. 1c), all of which have at one side connections to the positive line side. By the date setting mechanism the magnets 230D are connected to certain of the ten-digit selecting line wires 106. From these ten line wires there are wire connections 260 to ten contact points of an emitter E$m$. This emitter is also shown in Fig. 6 and its contact making arm 261 is attached to the shaft 217 so as to rotate synchronously with the rotation of the type wheels.

The circuit connection to the negative line side 35 from the arm 261 is effected through relay contacts 163n now closed (Fig. 1d) and wires 262, 263, 133, 73, 74, contacts 75, wire 78, contacts 79, wire 82 to the negative line side.

Hence, by transmission of electrical impulses to the magnets 230D at differential times a series of four printing wheels 221 will be stopped at positions to print digits representing the date.

The next data printed comprises the printing of the type of transaction by a single type printing wheel 221.

The printing wheel 221 for this order will print "2" to indicate a withdrawal instead of the normal "0" type, which represents a deposit as shown in Fig. 7. When the relay magnet 163 (Fig. 1b) is energized, its relay contacts 163f are closed, and for a withdrawal transaction relay contacts 140d are closed because the depression of the withdrawal key 139 causes magnet 140 to be energized if it is not energized. A circuit is then completed from the positive line side 34 (Fig. 1a), wire 55, relay contacts 56a, wire 57, a branch wire 264, printing control magnet 230T, relay contacts 163f, relay contacts 140d, and a wire connected to the line wire 106$_2$. Thus, the "2" type will be selected. For printing "0" it will be seen that this is effected by the deenergization of magnet 140 effected by the depression of the deposit key 139 which causes magnet 140 to be deenergized if it is energized. Hence, relay contacts 140d are opened and the printing wheel will now rotate a complete revolution so as to print "0." The type printed is really immaterial as long as their significance is recognized.

For printing either a deposit or withdrawal amount, there is provided a set of six printing wheels for each. As the selection is the same for each order, only the circuits for selecting the type wheel of the tens of thousands order will be used for explanation with particular reference to Fig. 1d.

The deposit printing control magnet 230DE for this order has the usual wire connection 265 to the positive line side, and the circuit then extends from this magnet by a wire to relay contacts 140e, now closed because the deposit key 138 causes the deenergization of magnet 140 if it was not energized; relay contacts 163g now closed, and the wire 158 to the movable contact point 145. The position of the slide 144 in this order will thereby select the appropriate digit line wire 106 by the wires in cable 156 (see Fig. 1d) and since digit line wires 106 are connected to the emitter E$m$ the type will be selected appropriate to the digits selected by the slides 144.

If the entry is a withdrawal, magnet 140 is energized and thus relay contacts 140f are closed to select the withdrawal type printing control magnet 230w (Fig. 1d). Hence, the amount of the transaction is printed in the appropriate column depending upon whether it is a withdrawal or deposit.

For printing the amount of the balance which is the difference between the old balance and the withdrawal or deposit, there is provided a series of six printing control magnets 230. By means fully disclosed in the parent application, the new balance is determined by means forming no part of the present invention in order that certain printing control magnets 230 will be energized under control of differentially timed impulses to select type of the six balance printing wheels to thereby print upon the pass-book the old balance, as shown in Fig. 7.

As best shown in Fig. 7, the printing of the account number is effected in the column at next to the extreme right of the pass-book and such printing is under control of four account number printing control magnets 230N (Fig. 1a). These four magnets 230N have a common wire connection 268 to the positive line side 34 and by relay contacts 163k now closed and relay contacts 160b now closed, the magnets 230N are electrically connected to the common bars 17 of the card analyzer for the account number. The circuit then extends by wires 62 where there are perforations to related relay contacts 160b and then by wires 269 to the digit selecting wires 106. Hence, by the emitter E$m$ (Fig. 1d) the type of four account number printing wheels will be selected under control of the card analyzer to print the account number perforated therein.

*Breakdown of relays at the termination of printing*

This function is performed under control of contacts 79 which when opened by the means previously described cause relay magnets 132 (Fig. 1c), 160, 163 (Fig. 1b) and solenoid 88 to be deenergized since their circuits to the negative line side 35 is broken by these contacts. Since solenoid 88 is now deenergized the pass-book carriage is unlocked so that it may be restored to normal by hand or by a return spring.

*Ejecting balance card*

As previously stated, arm 256 causes contacts 257 to close thereby completing circuit from the negative line side 35, through contacts 257, magnets 270 and 271, wire 57, relay contacts 56a, and wire 55 to the positive line side.

From Fig. 11 it will be seen that, when magnet 270 is energized, it will rock a bail rod 272 and by means of the latter the pawls 248 thereby releasing the slides 144 for restoration by their return springs 147.

When magnet 271 (Fig. 6) is energized, its core having a connection at 21 to the toggle levers 22 and 23 will break the toggle system causing the analyzing head to be moved to release the card in analyzing position.

As shown in Fig. 10, the constantly rotating shaft 212 has bevel gear connections 273 and 274 to a drive shaft 275 to drive rollers 276 (Fig. 6) secured to the shaft. Rollers 277 cooperate with the rollers 276 but due to the card stop 20 they are normally prevented from feeding the tabulating card from analyzing position.

As the plate 13 is moved to the right, a shoulder 280 thereof will engage a hook-shaped arm 281 thereby rocking a bell crank 282 clockwise and an arm 283 counterclockwise. The arm 283 is connected to a shaft 284 to which the card stop 20 is attached. In this manner the card stop is shifted to the left away from the card so that the rollers 276—277 feed the card to a storage hopper 278.

A stationary pin 285 will coact with the hook-shaped arm 281 to unlatch it from shoulder 280 so that ultimately and after the card is fed to the hopper 278 the hook-shaped arm 281 will be released from the shoulder 280, thereby permitting a spring 286 to rock the bell crank 282, arm 283, and shaft 284 so that the card stop 20 is now in normal position in readiness to stop the next card inserted in the card analyzer.

*Pass-book printing line selecting device—Continued*

From Figs. 1b and 1c it will be seen that the relay magnets $132_1$—$132_9$ have individual wire connections to the contact points 18 so that the perforations at the index point positions 1–9 will select the corresponding relay magnets $132_1$—$132_9$ for energization. The relay contacts 132c of each magnet have, as previously described, wire connections to the digit selecting lines $106_2$—$106_0$ and arranged so as to cause punching on the new balance card as follows:

| Old balance card Sense index point position | New balance card Punch index point position |
|---|---|
| 1 | 2 |
| 2 | 3 |
| 3 | 4 |
| 4 | 5 |
| 5 | 6 |
| 6 | 7 |
| 7 | 8 |
| 8 | 9 |
| 9 | 0 |

Therefore, it is clear that the sensing of each old balance card punched in column 60 at one of the index point positions 1–9 will cause punching of the new balance card at positions 2–0, respectively, so that the effective contact points 86 (Fig. 1b) will stop the movement of the carriage at any of the ten printing lines of the pass-book.

Now, when a new balance card is perforated at the "0" position (see Fig. 4) as in the above table, it is then used as an old balance card and upon the next transaction the "0" is sensed to close a circuit from the contacts 16—18 at the "0" index point position to cause the energization of the "0" relay magnet 132 to open its contacts 132b, close its contacts 132d and 132c, the latter causing the punching on the new balance card at the "1" index point position (see Fig. 5). Thus, this relay magnet will also close its relay contacts 132d which are connected to the wire 137 connected as shown in Fig. 1e to a column contact at the 60th column position. From the other side of relay contacts 132d controlled by the "X" magnet 132 and now closed the circuit leads to the digit selecting line $106x$ to cause punching at the "X" index point position in column 60 of the new balance card, as well as punching at the "1" index point position of the same column as shown in Fig. 5. Of course, the card perforated at "0" selects the tenth printing line of the pass-book.

Now when the card which is perforated at both the "X" and "1" positions (see Fig. 5) is analyzed, it will be seen that the former designation will cause the energization of the "X" magnet 132 to close its relay contacts 132a and open its relay contacts 132b. This magnet also closes its relay contacts 132c to continue a circuit from the line $106x$ through the relay contacts 132c and through relay contacts 132e controlled by the "0" relay magnet 132 to a line 320 which is connected as shown in Fig. 1e to a supplemental column contact at the 60th column position to cause the perforating at the "X" position and at the "2" position on the new balance card.

It will be seen that the energization of the "X" relay magnet 132 opens its relay contacts 132e (Fig. 1b) and closes its relay contacts 132f thus switching the wire 91 in circuit connection with the movable contact element 52. Therefore, the switch points 86 will be ineffective and a multiple set of switch points 321 are now effective so that the selected switch point 321 will cause the carriage to be locked to select printing lines 11 to 20 inclusive of the pass-book.

It will be seen that the sensing of a perforation at the "X" position will cause the "X" relay magnet to close its contacts 132c to repeat the "X" perforation on each new balance card. However, for selection of the twentieth printing line the "0" perforation is made with the "X" perforation. The "0" perforation causes the punching of the next card at the "1" position.

When the "0" perforation is analyzed it will cause relay magnet $132_0$ to open its contacts 132e and while its contacts 132d close the sensing of the perforation at the "X" position will cause the "X" magnet 132 to be energized to open its relay contacts 132d, thus preventing the punching of an "X" on the next card being punched with "1." Thus, the series is repeated so that the next set of tabulating cards may control line selection of the next pass-book of the same account.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In punching machine controlled by single transaction cards comprising separate analyzing means for analyzing account number data on a previous transaction card and a record sheet and comparing means controlled thereby, means for setting up in the machine a representation of an amount pertaining to a subsequent transaction, perforating means controlled by said setting means for perforating said amount on a subsequent transaction card, operation initiating means for said perforating means, and means controlled by said comparing means for effecting upon agreement of the account number data compared the operation of said operation initiating means to cause the operation of the perforating means.

2. In a punching machine controlled by single transaction cards comprising separate analyzing means for analyzing account number data on a previous transaction card and a record sheet pertaining to the transaction card and comparing means controlled thereby, perforating means controlling one of said analyzing means to perforate the account number data on a subsequent transaction card, operation initiating means for initiating the operation of said perforating means, and means controlled by said comparing means for causing the operation of said perforating means upon agreement of the account number data on said record sheet and the previous transaction card.

3. In a punching machine controlled by single transaction cards comprising separate analyzing means for analyzing account number data on a previous transaction card and a record sheet pertaining to the transaction card and comparing means controlled thereby, perforating means controlled by one of said analyzing means to perforate the account number data on a subsequent transaction card, analyzing means for analyzing a record sheet printing line selecting perforation on said previous transaction card, means controlled by said last named analyzing means for causing supplemental perforating means to perforate said subsequent transaction card with a perforation representing a printing line to be selected which is one unit higher, and means controlled by said comparing means to cause the operation of both of said perforating means upon agreement of the account number data on said second sheet and the previous transaction card.

4. In a perforating machine, means comprising a series of punches correlated with index point positions of a record for perforating a record at a selected index point position to represent by a perforation one of a series of digits, means for analyzing perforations of another record located at corresponding index positions, a single perforation representing one of said digits, and punch controlling means controlled by said analyzing means for selecting the desired one of said punches to punch said other record to represent digits always varying by the same digital value from the digits represented by the record analyzed.

5. In a perforating machine, means comprising punches for perforating a record to represent by perforations one or more digits of different denominational orders, means for analyzing perforations of another record representing digits of said different denominational orders, and means controlled by said analyzing means to select said punches to punch said other record to represent digits one unit higher and of the same or higher denominational order.

6. In a perforating machine, means for perforating a record to represent by a perforation one of a series of digits, means for analyzing perforations of another record representing digits, and means intermediate said analyzing and perforating means to cause the perforating means to perforate the first named record to represent a digit one unit higher than the digit represented by the perforation of the other record analyzed.

7. In a machine of the class described, means for analyzing a perforation at one of a series of digit representing positions, means for perforating another record at digit representing positions, a plurality of set-up means one of which is set up under control of said analyzing means dependent upon the perforation analyzed, and means rendered operable by each of said analyzing means for causing said perforating means to cause a perforation to be made on a subsequent record at a digit representing position a unit higher than that represented by the perforation analyzed.

8. A machine for perforating records to control selection of printing lines of a data sheet comprising means for analyzing printing line selecting data comprising perforations on a record at one of a series of digit representing positions, means for perforating another record at said digit representing positions for controlling subsequent printing line selecting operations, and means rendered operable by said analyzing means for causing said perforating means to perforate a record at a digit representing position differing from the digit representing position of the perforation of the record analyzed.

9. In a perforating machine, a series of electromagnetically controlled digit representing perforating means, means for analyzing perforations of a record at one of a series of digit representing positions, and means for selecting said electromagnetically controlled perforating means under control of said analyzing means and including means to select said digit representing perforating means to cause the perforation of a record a unit higher than the digit representing perforation analyzed.

10. In a perforating machine, means for analyzing a column of a card to determine the location of a single perforation representing a digit of one denominational order, or combination of perforations in the same column representing digits of a plurality of denominational orders, punches for perforating a record to represent by perforations digits or numbers one unit higher than the previous digit or number representing perforation analyzed, and means controlled by said analyzing means to select said punches to punch said other record with one perforation, or combination of perforations in the same column thereof, to represent digits or numbers one unit higher than the previous digit or number representing perforation analyzed.

TORKEL E. TORKELSON.